United States Patent
Connor et al.

(10) Patent No.: US 9,400,789 B2
(45) Date of Patent: Jul. 26, 2016

(54) ASSOCIATING RESOURCES WITH ENTITIES

(71) Applicant: Google Inc., Mountain View, CA (US)

(72) Inventors: James T. Connor, Mountain View, CA (US); Alexandre A. Verstak, Cupertino, CA (US); Anurag Acharya, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 13/944,705

(22) Filed: Jul. 17, 2013

(65) Prior Publication Data

US 2015/0169562 A1     Jun. 18, 2015

Related U.S. Application Data

(60) Provisional application No. 61/674,255, filed on Jul. 20, 2012, provisional application No. 61/786,136, filed on Mar. 14, 2013.

(51) Int. Cl.
    *G06F 17/30*          (2006.01)

(52) U.S. Cl.
CPC .... *G06F 17/30011* (2013.01); *G06F 17/30705* (2013.01); *G06F 17/30598* (2013.01); *G06F 17/30675* (2013.01); *G06F 17/30699* (2013.01); *G06F 17/30867* (2013.01)

(58) Field of Classification Search
CPC .................. G06F 17/30705; G06F 17/30011; G06F 17/30598; G06F 17/30675; G06F 17/30699; G06F 17/30867
USPC ......... 707/740, 758, 738, 737, 748, 723, 728, 707/708, 751, 732; 715/210, 215
See application file for complete search history.

(56) References Cited

U.S. PATENT DOCUMENTS

| | | | |
|---|---|---|---|
| 5,857,179 A | 1/1999 | Vaithyanathan et al. | |
| 6,038,574 A * | 3/2000 | Pitkow et al. | 715/210 |
| 6,654,743 B1 | 11/2003 | Hogg et al. | |
| 6,944,612 B2 | 9/2005 | Roustant et al. | |
| 7,664,735 B2 * | 2/2010 | Zhang | G06F 17/30867 707/723 |
| 8,374,975 B1 | 2/2013 | Cierniak et al. | |
| 8,386,487 B1 * | 2/2013 | Ben-Artzi et al. | 707/737 |
| 8,661,029 B1 * | 2/2014 | Kim | G06F 17/30867 707/723 |
| 8,938,463 B1 * | 1/2015 | Kim | G06F 17/30867 707/751 |
| 2005/0138079 A1 * | 6/2005 | Liu et al. | 707/104.1 |
| 2005/0165780 A1 * | 7/2005 | Omega et al. | 707/7 |
| 2008/0091684 A1 * | 4/2008 | Ellis | G06F 17/30011 |
| 2008/0256093 A1 * | 10/2008 | Amitay et al. | 707/100 |
| 2009/0070325 A1 * | 3/2009 | Gabriel | G06F 17/30705 |
| 2009/0228452 A1 * | 9/2009 | Zhang et al. | 707/3 |
| 2009/0259661 A1 * | 10/2009 | Cragun | G06F 21/6218 |

(Continued)

*Primary Examiner* — Frantz Coby
(74) *Attorney, Agent, or Firm* — Fish & Richardson P.C.

(57) ABSTRACT

Methods, systems, and apparatus, including computer programs encoded on computer storage media, for associating resources with entities. One of the methods includes clustering a plurality of first documents into one or more first document groups, wherein each of the one or more first document groups is associated with a proper name of an author; receiving a query that specifies a particular proper name of a particular author; generating a result list of one or more documents that satisfy the query, the documents being listed in order of rank; ranking the one or more first document groups based on the one or more documents that satisfy the query; and providing the one or more first document groups, wherein the one or more first document groups are presented in an order based on the ranking.

42 Claims, 5 Drawing Sheets

(56) References Cited

U.S. PATENT DOCUMENTS

| | | | |
|---|---|---|---|
| 2009/0327243 A1* | 12/2009 | Pradhan et al. | 707/3 |
| 2010/0017475 A1* | 1/2010 | Colson et al. | 709/206 |
| 2010/0042610 A1* | 2/2010 | Lakhani | G06F 17/30699 707/708 |
| 2011/0173187 A1* | 7/2011 | Lee et al. | 707/722 |
| 2012/0284275 A1* | 11/2012 | Vadrevu | G06F 17/30864 707/738 |
| 2013/0006979 A1 | 1/2013 | Bonanni et al. | |
| 2013/0198192 A1* | 8/2013 | Hu et al. | 707/738 |

* cited by examiner

Add Articles

| 402 → Stephen Hawking | Search Article Groups |

Article Groups

Stephen W Hawking 〉 *410*

The large scale structure of space-time  〉 *412*
  SW Hawking... - 1975

Particle creation by black holes  〉 *414*
  SW Hawking – Communications in mathematical physics, 1975

*416* { [ Add all 427 articles ]   See all articles

Stephen Hawking

The Physics of Star Trek
  L Krauss - 2007

On the shoulders of giants: The great works of physics
  S Hawking - 2003

[ Add all 28 articles ]   See all articles

Stephen Hawking

NOVA HISTORIA DO TEMPO, UMA:ORIGINAL BRIEFER
  S Hawking... - 2006

L'universo in un guscio di noce
  SW Hawking - 2009

[ Add all 27 articles ]   See all articles

Stephen Hawking

A Brief History of Time, 1996
  S Hawking

Sixty years in a nutshell
  S Hawking – The future of theoretical physics and cosmology: ..., 2003

[ Add all 28 articles ]   See all articles

ASSOCIATING RESOURCES WITH ENTITIES

CROSS-REFERENCE TO RELATED APPLICATIONS

This application claims the benefit of U.S. Patent Application Ser. No. 61/674,255, filed Jul. 20, 2012 and U.S. Patent Application Ser. No. 61/786,136, filed Mar. 14, 2013. The entire contents of the prior applications are hereby incorporated by reference.

BACKGROUND

This specification relates generally to associating network accessible resources with entities in the context of digital information retrieval.

A resource can be any type of digital information that is accessible over a network. Examples of resources include network accessible documents, scholarly articles, web pages, videos, audio files, applications, images, books, magazines, news articles, emails, blogs, and patents. Resources typically are linked. One web page, for example, can include a link to another web page. A scholarly article can reference one or more other articles.

An entity represents one or more people and, moreover, can be described by one or more resources. Examples of entities include a particular person, a group of people, one or more groups in a social network, a particular company or groups of companies, and any organization of one or more people. An entity can be either generic, e.g., a U.S. president, or it can be particular, e.g., President George Washington.

A corpus of digital information, examples of which include the Internet and its subset, can contain various types of resources. Moreover, resources typically are or can be associated with one or more entities. For example, scholarly articles available on the Internet are resources that can be associated with their authors, videos are resources that can be associated with the persons who created or posted the videos, images are resources that can be associated with the persons shown in the images, and news articles are resources that can be associated with persons the articles describe.

SUMMARY

This specification describes technologies relating to accurately and comprehensively finding, in a corpus of digital information, resources that are associated with an entity by clustering resources, generating a result list of retrieved and ranked resources, and then selecting one or more clusters based on one or more matching parameters between cluster and list.

In general, one innovative aspect of the subject matter described in this specification can be embodied in methods that include the actions of clustering a plurality of first documents into one or more first document groups, wherein each of the one or more first document groups is associated with a proper name of an author; receiving a query that specifies a particular proper name of a particular author; generating a result list of one or more documents that satisfy the query, the documents being listed in order of rank; ranking the one or more first document groups based on the one or more documents that satisfy the query; and providing the one or more first document groups, wherein the one or more first document groups are presented in an order based on the ranking Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

The methods can further include receiving a selection of one or more of the presented first document groups; and in response to receiving the selection of the one or more presented first document groups, generating a profile for the particular author, wherein the profile includes the first documents in the selected one or more first document groups.

The methods can further include clustering a plurality of second documents into one or more second document groups, wherein each of the one or more second document groups is associated with a proper name of an author; for each of the one or more second document groups: calculating a correspondence score for the second document group and the profile for the particular author; determining that the correspondence score satisfies a threshold; and updating the profile for the particular author, wherein updating the profile comprises adding the second documents in the second document group to the profile for the particular author.

Clustering the plurality of first documents into one or more first document groups can include analyzing one or more features of the first documents to determine associations between the first documents; and clustering the plurality of first documents into one or more first document groups based on the determined associations.

Analyzing the one or more features of the first documents can include determining the associations between the first documents based on the one or more features of the first documents using a clustering algorithm. The one or more features of the first documents can include at least one of title, place of publication, documents referenced by the first documents, documents that reference the first documents, and proper names of authors; and wherein, when the one or more features include proper names of authors, the one or more features of the documents further include at least one of author email addresses and author affiliations.

Ranking the one or more first document groups can include, for each of the one or more first document groups, identifying a number of matching documents, wherein the matching documents are documents that are identified from both the first document group and the one or more documents that satisfy the query; identifying a rank for each of the identified matching documents, wherein the rank describes how responsive the document is to the received query based on one or more signals; and determining a name matching score, wherein the name matching score represents a similarity between the proper name associated with the first document group and the particular proper name of the particular author; calculating a score for the first document group based on the number of matching documents, the rank for each of the matching documents, the one or more signals, and the name matching score; and ranking the one or more first document groups based on the calculated scores for each of the one or more first document groups.

Clustering a plurality of second documents into one or more second document groups can include modifying a clustering algorithm, wherein the plurality of first documents are clustered into the one or more first document groups based on the clustering algorithm, wherein the modifying can include identifying documents from the selected first document groups that are not in the profile for the particular author; identifying documents from the profile for the particular author that are not in the selected first document groups; modifying the clustering algorithm based on the identified documents; determining associations between the plurality of second documents using the modified clustering algorithm; and clustering the plurality of second documents into one or more second document groups based on the determined associations.

The correspondence score for the second document group and the profile for the particular author represents a level of correspondence between second documents in the second document group and the documents included in the profile.

Calculating the correspondence score can include determining a first value, wherein the first value is a number of second documents that are in the second document group and in the profile; determining a second value, wherein the second value is a number of second documents that are in the second document group that have never been in the profile; determining a third value, wherein the third value is a number of second documents that are in the second document group that have been removed from the profile; determining a name matching score, wherein the name matching score represents a similarity between the proper name associated with the second document group and the particular proper name of the particular author; and calculating the correspondence score based on the first value, second value, third value, and name matching score.

Providing the one or more first document groups can include providing a predetermined number of the one or more first document groups.

In general, another innovative aspect of the subject matter described in this specification can be embodied in methods that include the actions of clustering a plurality of documents into one or more document groups, wherein each of the one or more document groups is associated with a proper name; identifying a profile, wherein the profile includes one or more documents and a proper name for the profile; for each of the one or more document groups, calculating a correspondence score for the document group and the profile; determining that the correspondence score satisfies a threshold; and updating the profile, wherein updating the profile comprises adding the documents in the document group to the profile. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment may include all the following features in combination.

The correspondence score for the document group and the profile represents a level of correspondence between the one or more documents included in the profile and the documents in the document group.

Calculating the correspondence score can include determining a first value, wherein the first value is a number of documents that are in the document group and in the profile; determining a second value, wherein the second value is a number of documents that are in the document group that have never been in the profile; determining a third value, wherein the third value is a number of documents that are in the document group that have been removed from the profile; determining a name matching score, wherein the name matching score represents a similarity between the proper name associated with the document group and the proper name for the profile; and calculating the correspondence score based on the first value, second value, third value, and name matching score.

In general, another innovative aspect of the subject matter described in this specification can be embodied in methods that include the actions of clustering a plurality of resources on one or more social networks into one or more resource groups, wherein each of the one or more resource groups is associated with a proper name of a person associated with the resource group; receiving a query, wherein the query includes a proper name of a person of interest on the one or more social networks; generating a ranked list of the one or more resource groups based on the received query; and providing resources from a top-ranked resource group of the ranked one or more resource groups. Other embodiments of this aspect include corresponding computer systems, apparatus, and computer programs recorded on one or more computer storage devices, each configured to perform the actions of the methods.

The subject matter described in this specification can be implemented in particular embodiments so as to realize one or more of the following advantages. Groups of associated resources can be ranked in relation to relevance with an entity. The most relevant groups of associated resources can be easily identified based on the ranking and subsequently associated with the entity. Resources associated with an entity can be automatically updated as groups of associated resources change. A user indicating interest in the entity can be notified of changes to the resources associated with the entity.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates an example graphical user interface for generating profiles from resource groups.

Like reference numbers and designations in the various drawings indicate like elements.

DETAILED DESCRIPTION

Figure 1:
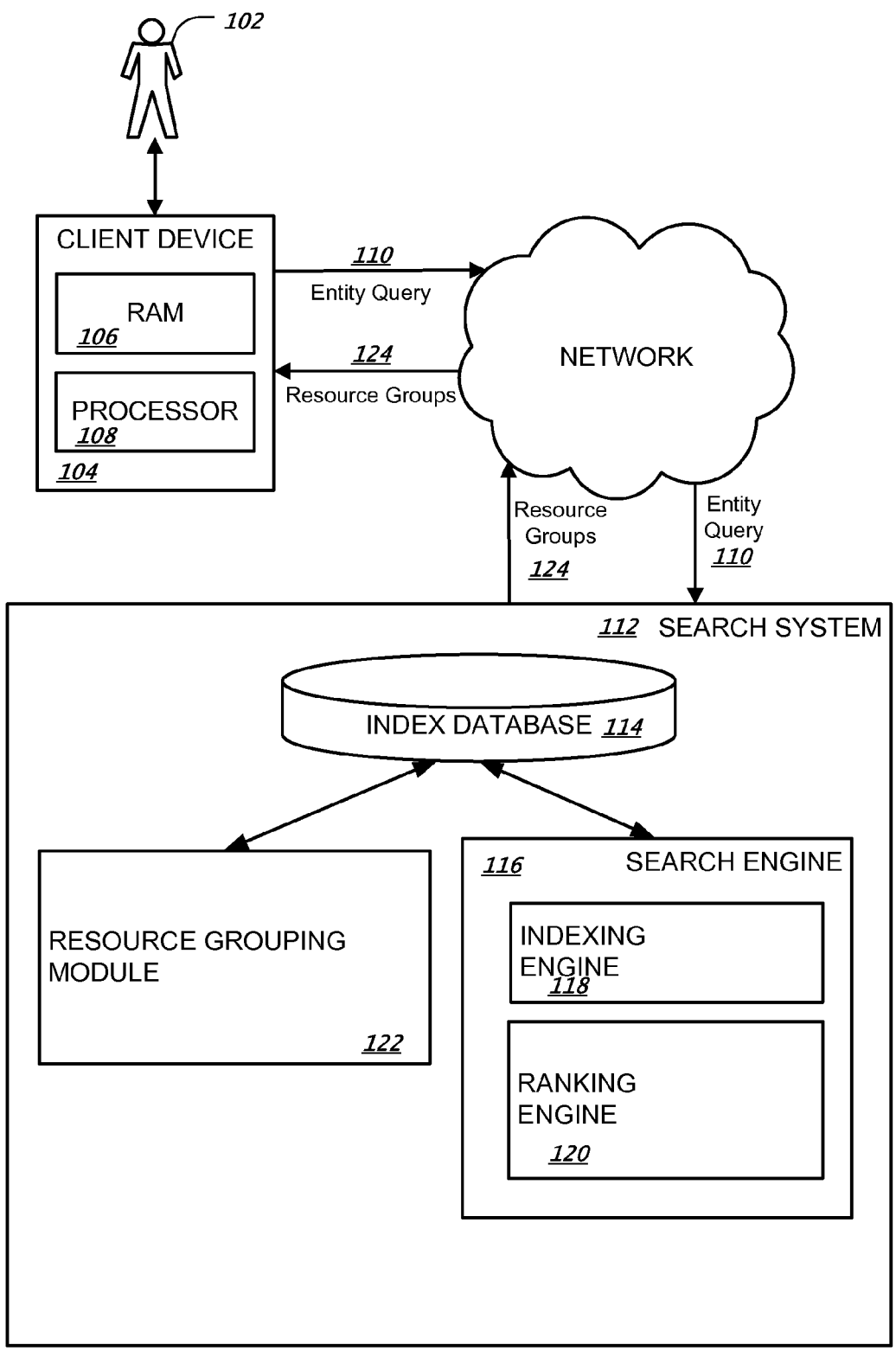
FIG. 1 illustrates an example search system for providing a result list of resources in response to receiving a query that specifies one or more entities.

FIG. 1 illustrates an example search system 112 for providing a result list of resources in response to receiving a query that specifies one or more entities, i.e., an entity query. The system is suitable for use with an Internet, an intranet, or another client and server environment. The search system 112 is an example of an information retrieval system in which the systems, components, and techniques described below can be implemented.

A user 102 can interact with the search system 112 through a client device 104. As used herein, a user is any natural person. In some implementations, the client device 104 can communicate with the search system 112 over a network. For example, the client device 104 can be a computer coupled to the search system 112 through one or more wired or wireless networks, e.g., mobile phone networks, local area networks (LANs), or wide area networks (WANs), e.g., the Internet. The client device 104 will generally include a random access memory (RAM) 106 and a processor 108, and one or more user interface devices, e.g., a display or a speaker for output, and a keyboard, mouse, microphone, or touch sensitive display for input. In some implementations, the client device 104 can communicate directly with the search system 112. For example, components of the search system 112 and the client device 104 can be implemented on one machine. For example, a user can install a desktop search application on the client device 104. In some implementations, the search system 112 can be implemented as, for example, computer programs running on one or more computers in one or more locations that are coupled to each other through a network.

A user 102 can submit an entity query 110 to search system 112. An entity query is any query that identifies at least one entity. An example entity query is "Noam Chomsky." In some implementations, an entity query includes the proper name of user 102. Here, user 102 is the entity being specified by the query. In some implementations, the entity query includes additional information about the entity. For example, the entity query can also include one or more affiliations or email addresses associated with the entity identified by the entity query. For example, the entity query can include "Massachusetts Institute of Technology," the affiliation associated with entity Noam Chomsky or Noam Chomsky's email address. In other implementations, the query can further include any additional entities of interest. For example, the entity query can further include "American Academy of Arts and Sciences," which Noam Chomsky is a member of. The user 102 can use the one or more user interface devices of the client device 104 to submit the entity query. For example, user 102 can interact with a keyboard or touch sensitive display for input to submit the entity query 110 to a graphical user interface of search system 112. Other methods of submitting queries to search system 112 can also be performed. For example, user 102 can submit the entity query 110 by speaking the query. A microphone associated with client device 104 can detect the query 110 and transmit the query 110 through a network to search system 112.

The search system 112 includes a search engine 116, an index database 114, and a resource grouping module 122.

Search engine 116 identifies resources that are responsive to entity query 110. The search engine 116 will generally include an indexing engine 118 and a ranking engine 120. Indexing engine 118 processes and updates network accessible resources, e.g., documents, web pages, images, or news articles on the Internet, found in a network accessible corpus, e.g., a collection or repository of content, in index database 114 using conventional or other indexing techniques. In some implementations, the index database 114 is a term index of network accessible resources. In some implementations, the index database 114 only contains certain types of resources, e.g., scholarly articles.

The ranking engine 120 uses the index database 114 to identify resources responsive to the query 110, for example, using conventional or other information retrieval techniques. The ranking engine 120 calculates scores for the resources responsive to the query, for example, using one or more ranking signals. Each signal provides information about the resource itself or the relationship between the resource and the query. One example signal is a measure of the overall quality of the resource. Another example signal is a measure of the number of times the terms of the query occur in the resource. Other signals can also be used. For example, the citation counts of documents can be considered in the scoring of the documents. The ranking engine 120 then ranks the responsive resources using the scores.

Resource grouping module 122 programmatically clusters resources in the index database 114 into resource groups. Each resource group is associated with a proper name of an entity. Resource grouping module 122 obtains information describing the ranked resources responsive to the query 110 from search engine 116. Resource grouping module 122 maps the information describing the ranked resources to their respective resources in the resource groups, as described in more detail below with reference to FIG. 3. The resource groups are ranked based on the mapped information.

The search system 112 transmits the ranked resource groups through the network to client device 104. The client device 104 presents the resource groups to the user 102. The resource groups can be presented in order of their respective rankings. A presented resource group describes the resources in the resource group. For example, the presented resource group can include the titles of the resources. Additionally, or alternatively, the presented resource group can contain links to the resources. Other information can be presented for each resource group. For example, the resource group can present the proper name of the entity associated with the resource group. Additionally, or alternatively, a summary of the resources in the presented resource group can also be presented.

The system 112 generates a profile based on a user 102 selection of one or more of the presented resource groups. The user 102 selection can be effected by using one or more user interface devices of the client device 104. In response, a profile is generated that includes the resources from the selected resource groups. A profile is a collection of resources that is associated with a specific entity.

Index database 114 is continuously or periodically updated as new resources are updated to index database 114 by indexing engine 118. Therefore, resource grouping module 122 is continually or periodically clustering the resources into new resource groups as the index database is updated. Resource grouping module 122 identifies profiles that correspond to the new resource groups and adds the resources in the corresponding resource groups to the profiles.

Figure 2:
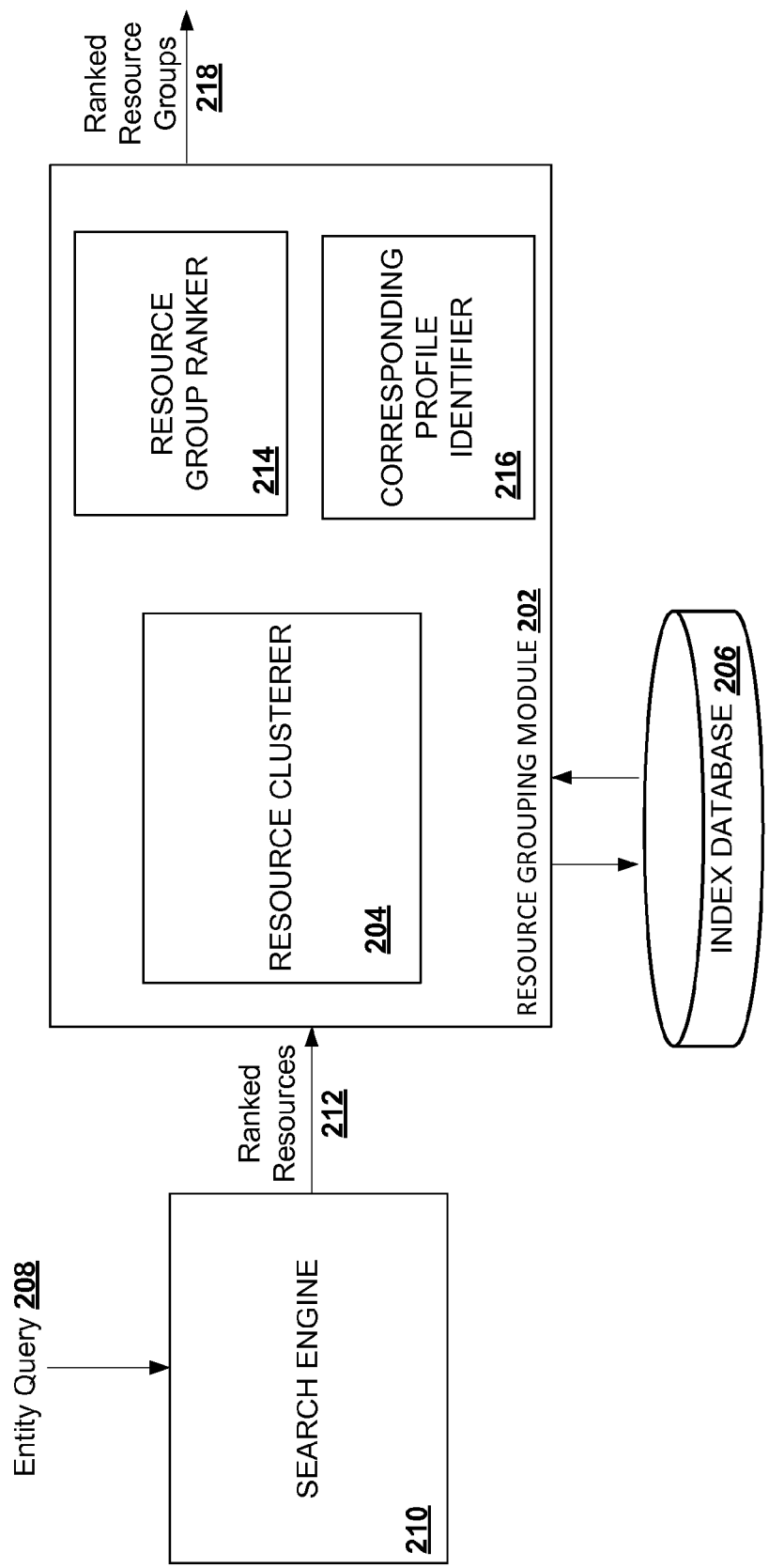
FIG. 2 illustrates an example resource grouping module.

FIG. 2 illustrates an example resource grouping module 202. The example resource grouping module 202 is an example of the resource grouping module 122 described above with reference to FIG. 1.

The resource grouping module 202 includes a resource clusterer 204, resource group ranker 214, and corresponding profile identifier 216. The resource grouping module 202 can communicate with index database 206 through one or more wired or wireless networks, e.g., mobile phone networks, local area networks (LANs) or wide area networks (WANs), e.g., the Internet. In some implementations, index database 206 can be an example of the index database 114 described above with reference to FIG. 1. In some implementations, index database 206 can be one or more index databases. Index database 206 can contain a variety of different types of resources, e.g., documents, web pages, images, or news articles on the Internet. Alternatively, the index database 114 can contain one or more specific types of resources, e.g., scholarly articles.

The resource clusterer 204 analyzes the resources in index database 206 and clusters the resources in index database 206 into resource groups, as described in more detail below with reference to FIG. 3.

In response to receiving an entity query 208, search engine 210 generates a list of ranked resources 212 that are responsive to entity query 208, as described in more detail above with reference to FIG. 1. Search engine 210 can be an example of the search engine 116 described above with reference to FIG. 1. Resource grouping module 202 obtains information describing the ranked resources 212 from the search engine 210. Resource group ranker 214 maps the information describing the ranked resources to their respective resources in the resource groups generated by resource clusterer 204. Resource group ranker 214 ranks the resource groups clustered by resource clusterer 204 based on the mapped information, as described in more detail below with reference to FIG. 3. The ranked resource groups 218 can then be provided by the search system to a client device and presented to a user, as described in more detail above with reference to FIG. 1.

The corresponding profile identifier 216 identifies profiles that correspond to resource groups generated by resource clusterer 204, as described in more detail below with reference to FIG. 5. Resources in resource groups that are determined to correspond to a profile are added to the profile by resource grouping module 202.

Figure 3:
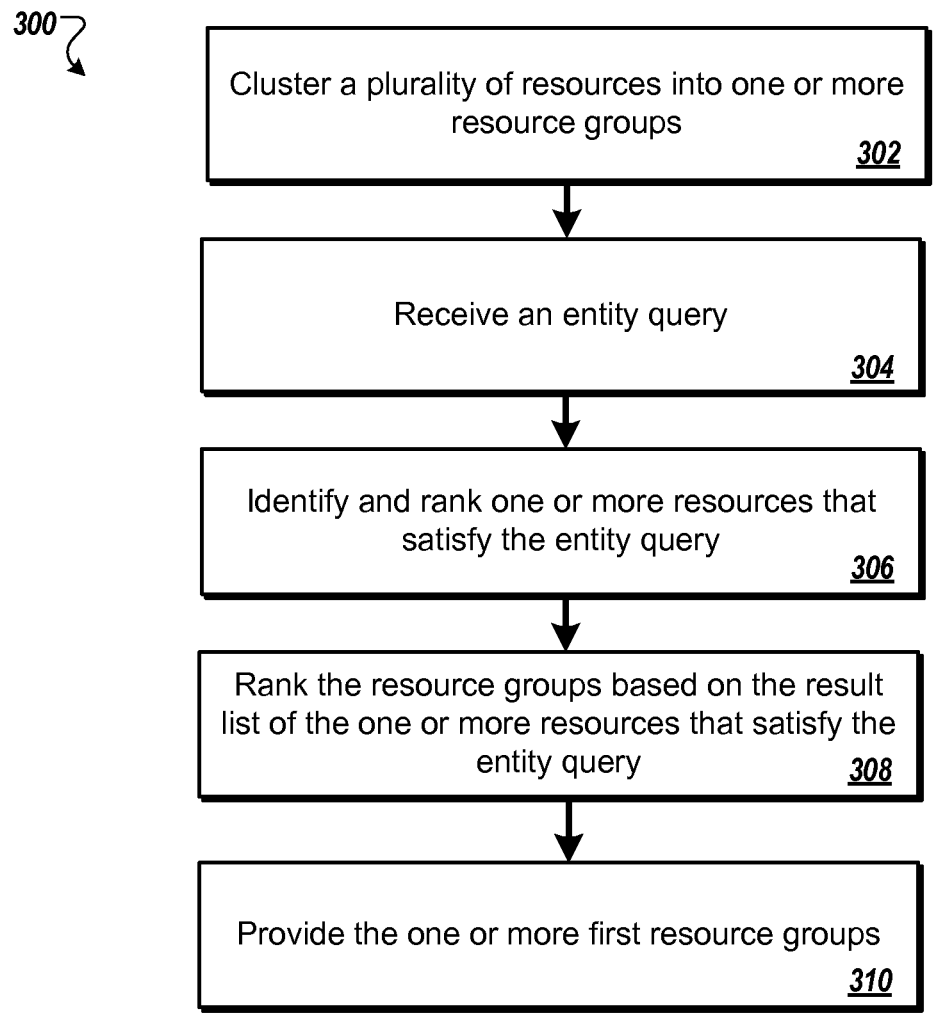
FIG. 3 illustrates an example method for ranking one or more resource groups.

FIG. 3 illustrates an example method for ranking one or more resource groups. For convenience, the example method 300 will be described in reference to a system that performs method 300. The system can be, for example, the search system 112 described above with reference to FIG. 1.

The system clusters a plurality of resources into one or more resource groups (302). Each of the one or more resource groups is associated with a proper name of an entity. In some implementations, the resource groups are clustered on the features of the resources. For example, scholarly articles can be clustered based on features that include the titles of the scholarly articles, the places of publication for the scholarly articles, and proper names of the authors of the scholarly articles. Other features can be used. For example, email addresses associated with the authors and affiliations of the authors can help cluster resources into resource groups. Additionally, scholarly articles can be clustered based on the other documents referenced by the scholarly articles and other documents that reference the scholarly articles. References can be links between the scholarly articles and documents. Affiliations can be any entity that the author is associated with, e.g., companies, universities, and organizations. The features of the first resources are analyzed to determine associations between the resources. The resources can be clustered into resource groups based on the determined associations between the resources. For example, resources with similar or identical features are clustered into the same resource groups. Resources with different features are clustered into different resource groups.

In some implementations, code implementing a conventional clustering algorithm analyzes the features of the resources to determine which resources to cluster into groups. In general, clustering algorithms well known and currently available would be suitable. Clustering algorithms are available that assigns resources to groups based on a degree of association between the resource and groups. For example, the features for resources can be provided to a clustering algorithm. The clustering algorithm compares the features for the resources and applies the appropriate learned weights to the features. The resulting values are used to calculate association scores between the resources. The resulting values can be combined according to a combination function, for example, the values can be added or multiplied together. Resources with association scores above a predetermined threshold are clustered into the same resource groups.

The system receives an entity query (304), as described above with reference to FIG. 1. For example, the system receives an entity query that includes the proper name of a user submitting the entity query. Alternatively, the entity query can include the proper name of any natural person.

The system identifies and ranks one or more resources that satisfy the entity query (306), as described above with reference to FIG. 1, and generates a result list of the resources. In the list, resources can be ordered according to their respective ranks.

The system ranks the resource groups based on the result list of the one or more resources that satisfy the entity query (308). In some implementations, the system obtains information describing the one or more resources that satisfy the entity query to rank the resource groups. For example, the system maps the resources that satisfy the entity query (i.e., resources referenced in the list) to resources in the resource groups. The mapping can include matching resources that satisfy the entity query to resources in the resource groups to determine the number of matching resources in each of the resource groups. The mapping can be based on different identifiers for the resources, e.g., title, URL, tokens, identification numbers, etc. The number of matching resources can be used to determine the ranking for a particular resource group.

For example, a resource group of scholarly articles that contains ten scholarly articles that are also referenced in the result list is ranked higher than a resource group that contains only eight matching scholarly articles. In some implementations, the ranking of the resource groups can be additionally dependent on a responsiveness of the matching resources to the entity query. For example, the system can obtain a responsiveness level for the matching resource by identifying the ranks or ranking scores calculated by a ranking engine for each of the matched resources in response to the entity query. The number of resources in a particular resource group that match resources that satisfy the entity query can be weighted by the ranks or ranking scores of the matched resources. The ranks or ranking scores of the matched resources can be averaged and weighted against the number of matched resources. For example, a resource group of scholarly articles that contains ten matched scholarly articles with an average ranking score of 0.8 is ranked higher than another resource group that also contains ten matched scholarly articles but with a lower average ranking score for the matched articles.

In some implementations, the ranking of the resource groups can be based on a matching of the proper names of the entities associated with the resource groups and the proper name of the entity that is included in the entity query. Because there are different ways to partition and structure the same proper name, different heuristics are used to restructure the different forms of the same proper name to first identify the closest match for the proper names. For example, in English naming convention, American inventor Thomas Alva Edison can be referred to as "Thomas Edison" or "Edison, T. A." To determine the best match, the proper names are restructured in different variations until the closet match for the proper names is found. Some heuristics include matching the full names as is, matching the names after the different parts in the name have been exchanged, matching the last names and a prefix or abbreviation for the other names, matching a prefix for the last name and an exact or prefix or abbreviated match for the other names. Other heuristics can be used. For example, the above heuristics can be repeated for different partitions of the names or a combination of the described heuristics can be used. In the above example, exchanging the placement of "Thomas" and "Edison." and using an abbreviation for "Thomas" in "Thomas Edison" produces "Edison T," the most similar match to "Edison, T. A."

After the proper names of the entities associated with the resource groups and the proper name of the entity included in the entity query are matched based on an above heuristic, an entity matching score can be calculated for each resource group. The entity matching score is a measure of how similar the matched proper names are. In some implementations, the entity matching score is proportional to the number of characters that match between the two names. Punctuation marks, e.g., periods, commas, can be ignored. Other methods for calculating the entity matching score can be used. For example, the proper name of an entity associated with a resource group and the entity included in the entity query can be partitioned into different components, e.g., last name, first name, and suffix. The partitions for the proper name of the group are matched with the respective partitions for the proper name of the entity query. A partition matching score is calculated for each of the matched partition pairs. The partition matching score for a matched partition pair can be a weighted combination of the length of the partition and the number of characters that match in the partition pair. The entity matching score for the resource group is a weighted sum of the individual partition matching scores. Resource groups can be ranked accordingly to their entity matching scores. For example, resource groups with greater entity matching scores are ranked higher than resource groups with lower entity matching scores.

In some implementations, the ranking of the resource groups is based on the number of matching resources, rank or ranking score for each of the matching resources, and the entity matching score for the respective resource groups. Ranking scores for the resource groups can be calculated using a combination function, e.g., a weighted sum, of the number of matching resources, sum of the ranks or ranking scores for each of the matching resources, and the entity matching score for the respective first resource group. The resource groups can then be ranked according to their respective ranking scores. In some implementations, additional signals can be used to rank the resource groups. For example, the different signals used to rank the resources in response to the entity query can be used.

The system provides the one or more resource groups (310), as described in more detail above with reference to FIG. 1. For example, the one or more resource groups can be provided to a client device, which can then display the resource groups to a user. In some implementations, the resource groups can be displayed in an order based the rankings for the resource groups. For example, resource groups with greater rankings are displayed before the resource groups with lower rankings.

The system can generate profiles that include the resources from the selected resource groups. In some implementations, the system receives a user selection of one or more of the provided resource groups. The selection can be effected, for example, by presenting resource groups in a graphical user interface to the user and prompting selection of resources by the user. In response to receiving the selections, the system generates a profile that includes the resources that are in the selected resource groups. In some implementations, the user can select specific resources in the provided resource groups. In response to receiving the specific resource selections, the system generates a profile that includes the specific selected resources. In other implementations, the system automatically generates a profile without receiving selections from the user. For example, the system can automatically generate a profile with resources from the top n-ranked resource groups, where n is a predetermined integer. For example, the system automatically generates a profile including resources from the three highest ranked resource groups. In some implementations, the generated profiles can be associated with the entity identified in the entity query. For example, the generated profile can be associated with the user, whose proper name is identified in the entity query, that submitted the entity query and selected the resources. Alternatively, the generated profile can be associated with any natural person whose proper name was specified in the entity query.

In some implementations, the system can automatically generate profiles for a list of received proper names. For example, instead of providing the system with an entity query, a user can provide the system with a list of proper names. The system can treat each provided proper name as an individual entity query. The system identifies and ranks resource groups for each of the proper names, as described above. The system can then automatically generate a profile for each of the proper names, using the ranked resource groups for the respective proper names. For example, a profile can be automatically generated for a proper name with resources from the top n-ranked resource groups for the proper name, where n is a predetermined integer.

In some implementations, the user can manually remove resources that the system added to the user's profile. The user can also manually add resources that the system did not include in the user's profile. These removals and additions are feedback signals that suggest that the clustering algorithm used to generate the resource groups selected by the user was inaccurate in the clustering of resources into resource groups. If the user is removing resources, then the statistical model is over-inclusive and associating resources that should not be associated in resource groups. On the other hand, if the user is adding resources, then the statistical model is under-inclusive and not associating resources that should be associated in resource groups. Thus, the clustering algorithm can be modified based on these feedback signals. For example, the removed or added resources can be analyzed to determine common features in the removed or added resources. The clustering algorithm can modify the weights applied to the determined common features. For example, the weights for common features in removed resources can be decreased. Alternatively, the weights for common features in added resources can be increased. In some implementations, the modified statistical model can be used to generate new resource groups for just the user that generated the feedback signals. In other implementations, the modified statistical model can be used to generate new resource groups for a population of users.

FIG. 4 illustrates an example graphical user interface for generating profiles from resource groups. FIG. 4 will be described below in the context of an example implementation of method 300. In this example implementation, a search engine clusters documents in an index database of scholarly articles into document groups. The documents are clustered according to similarities in scholarly articles features, e.g., titles, places of publication, and proper names of authors. Each document group is also associated with an entity associated with the document group, for example, the author of the scholarly articles in the document group.

In FIG. 4, an author submits entity query "Stephen Hawking" 402 to the search engine through the graphical user interface. In some implementations, entity queries can consist of an author's proper name, and other information associated with an author, for example, an author's affiliations and email address.

In response to the query, the search engine identifies documents that satisfy the entity query from the term index database of scholarly articles. The identified documents are used to rank the document groups. A combination function is used to generate a ranking score for each of the document groups. The combination function combines the number of matching documents, the rank or ranking score for each of the matching documents, and the entity matching score for the respective document groups. The document groups are ranked according to their ranking scores and presented in order of the ranking to the author. Document groups 404, 406, 408, and 410 are presented to the author in response to the query "Stephen Hawking" 402. The document groups 404, 406, 408, and 410 are presented in order of their rankings Document group 404 is the top ranked document group and document group 408 is the lowest ranked document group.

Each document group is represented in the graphical user interface. Each group can be represented by the entity the document group is associated with, by example documents from the document group, or both. For example, for document group 404, the displayed associated entity is "Stephen W Hawking" 410, and text describing example documents in document group 404 "The large scale structure of spacetime" 412 and "Particle creation by black holes" 414 is displayed. Furthermore, example documents 412 and 414 are presented with additional information, for example, an author list, date of publication, and publication source for the documents.

The author can identify and select the document groups that the author believes should be associated with him. In response to the selection, the system generates a profile for the author, where the profile includes scholarly articles in the selected document groups. For example, the author can identify that document group 404 should be associated with him. The author can select "Add all 427 articles" button 416. In response, all scholarly articles in document group 404 are added to a profile that is generated for the author.

Another example implementation of method 300 is the providing of resources associated with a natural person in a social network. In this example implementation, a search engine clusters resources that are found on one or more social networks or one or more networks, e.g., the Internet. The resources can include photos, videos, songs, news articles, messages, postings, or any other kind of resource that is shared or interacted with on one or more social networks or on the Internet. Resources that are associated with a person are clustered into a resource group. The resource group is further associated with a proper name of the person that is associated with the resources in the resource group. Associations with resources can also include any type of interaction with the resources. Example associations with resources include the uploading, sharing, posting, viewing, listening, and expressing approval of resources. For example, videos that have been watched, songs that have been liked, and messages that have been sent by a person can be clustered into a resource group for the person. As a further example, photos tagged with the person can also be clustered into the resource group for the person.

A user can perform a search for a person of interest. The query can include the proper name of the person of interest. A search engine performs a search for the proper name and identifies resources that satisfy the search query. The identified resources are used to rank the resource groups. A combination function is used to generate a ranking score for each of the document groups. The combination function combines the number of matching resources, the rank or ranking score for each of the matching resources, and the entity matching score for the respective resource groups. The resource groups are ranked according to their ranking scores. In some implementations, the resources in the top ranked resource group are presented to the user. For example, the user is presented with pictures that the person of interested is tagged in, media that the person of interest has viewed, and messages that the person of interest has posted. In other implementations the resources in the top n-ranked resource groups are presented to the user, where n is a non-negative integer.

Figure 5:
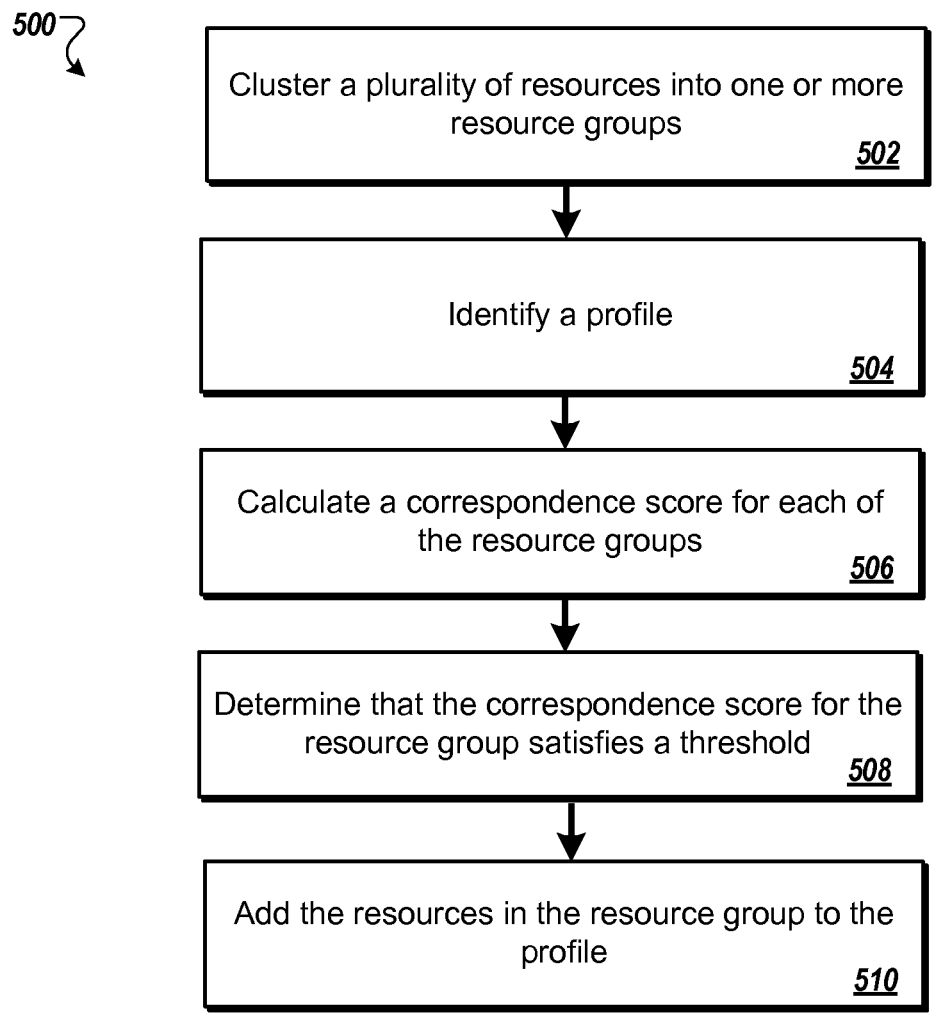
FIG. 5 illustrates an example method for updating resources associated with an entity.

FIG. 5 illustrates an example method for updating resources associated with an entity. For convenience, the example method 500 will be described in reference to a system that performs method 500. The system can be, for example, the search system 112 described above with reference to FIG. 1.

The system clusters a plurality of resources into one or more resource groups (502). A clustering algorithm can analyze the features of the resources to determine which resources to cluster into groups, as described above with reference to FIG. 3.

The system identifies a profile (504). The profile can be associated with an entity that represents a particular natural person. The profile contains one or more resources that are already associated with the entity.

The system calculates a correspondence score for each of the resource groups (506). In some implementations, the system determines a correspondence score between each of the resource groups and the identified profile. The correspondence score for a particular resource group represents a level of correspondence between the resources in the particular resource group and the resources included in the profile. The system determines different signals that the correspondence score for the particular resource group can be derived from. For example, the system can determine the number of resources, $X_1$, that are both in the particular resource group and in the profile. Additionally, the system can determine the number of resources, $X_2$, that are in the particular resource group that have been removed from the profile. Additionally, the system can determine the number of resources, $X_3$, that are in the particular resource group that have never been associated with the profile. Additionally, the system can determine an entity matching score, $X_4$, which represents a level of matching between the proper name of the entity associated with the particular resource group and a proper name of the entity associated with the profile. The method of calculating the entity matching score is described above in reference to FIG. 3. The correspondence score, CS, can be calculated as a function of these different variables. An example function is: $CS=C_1X_1-C_2X_2-C_3X_3$, wherein $C_1$, $C_2$, and $C_3$ are non-negative constants. Other functions can exist. For example: $CS=C_1X_1-C_2X_2-C_3(X_3-C_4)$, wherein $C_4$ is a non-negative constant when $X_4$ satisfies a predetermined threshold or $C_4=0$ when $X_4$ does not satisfy the predetermined threshold.

Resources that are already included in the profile can be found in multiple resource groups. In some implementations, these resources are assigned to one specific resource group when determining the correspondence scores for the different resource groups. For example, these resources are assigned to the specific resource group that maximizes a resource group assignment score. The assignment score, AS, can be calculated as a function of the same above variables. An example function is: $AS=W_1X_4+W_2X_1-W_3X_2-W_4(X_3-W_5X_4)$, wherein $W_1, W_2, W_3, W_4,$ and $W_5$ are non-negative constants.

If the system determines that the correspondence score for the particular resource group satisfies a threshold (508), then the system adds the resources in the particular resource group to the profile (510). A subset of the resources in the particular resource group may already be associated with the profile. In some implementations, only those resources that are not already in the profile are added to the profile. In some implementations, entity user can choose to receive profile update notifications. For example, when a profile is updated with new resources, the user interested in the profile, which can be the natural person the entity represents, can be notified of the changes.

An example implementation of method 500 is the addition of scholarly articles to a profile of an author of the scholarly articles. In this example implementation, a search engine clusters documents in an index database of scholarly articles into document groups, as described above with reference to FIG. 3. Each document group is also associated with an entity associated with the document group, for example, the author of the scholarly articles in the document group.

The system then identifies different profiles for different authors. Each profile contains scholarly articles authored by the author that the profile is for. The system determines a correspondence between each of the different profiles and document groups. A correspondence score is calculated for each profile and document group pair. The correspondence score represents a correspondence level between the scholarly articles in the profile and document group. For example, the correspondence score for a profile and document group pair can be calculated from the number of scholarly articles that are in both the document group and profile, the number of scholarly articles that are in the document group but have never been in the profile, and the number of scholarly articles that are in the document group but have been removed from the profile.

Document groups and profiles with correspondence scores that satisfy a threshold are determined to correspond. The scholarly articles in the document groups that correspond to a profile are added to the profile, thereby associating the author associated with the profile with the additional scholarly articles.

An electronic document, which for brevity will simply be referred to as a document, may, but need not, correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for identifying information to be added to an author profile for an author, the author profile identifying documents classified as being authored by the author, and the method comprising:
   clustering a plurality of first documents into one or more first document groups, wherein each of the one or more first document groups is associated with a respective author proper name;
   after clustering the plurality of first documents into the one or more first document groups:
      receiving author information from an author;
      generating a query that specifies a particular name of the author and one or more items of the author information received from the author;
      generating a result list of one or more documents that satisfy the query, the documents being ranked according to a document rank;
      ranking the one or more first document groups based on how many documents in the result list are included in each of the one or more first document groups, the ranking favoring first document groups having more documents from the result list over first document groups having fewer documents from the result list; and
      providing data describing the one or more first document groups in an order according to the ranking for selection by the author for inclusion in an author profile for the author that identifies documents classified as being authored by the author.

2. The computer-implemented method of claim 1, further comprising:
   receiving a selection of one or more of the first document groups; and
   in response to receiving the selection, including data identifying the documents in the one or more selected first document groups in the author profile for the author as documents authored by the author.

3. The computer-implemented method of claim 2, further comprising:
   clustering a plurality of second documents into one or more second document groups, wherein each of the one or more second document groups is associated with a respective author proper name;
   for each of the one or more second document groups:
      determining a correspondence score for the second document group in reference to the author profile for the author;
      determining whether or not the correspondence score satisfies a threshold; and
      when the correspondence score satisfies the threshold, including data identifying the second documents in the second document group as documents authored by the author in the author profile for the author.

4. The computer-implemented method of claim 3, wherein the correspondence score for each of the one or more second document groups is based on a count of documents that are in both the second document group and in the author profile, a count of documents that are in the second document group and have never been in the author profile, and a count of documents that are in the second document group and have been removed from the author profile.

5. The computer-implemented method of claim 1, wherein clustering the plurality of first documents into one or more first document groups comprises:
   clustering the plurality of first documents into one or more first document groups based on one or more respective features of the plurality of first documents, wherein the one or more features include at least one of:
   title;
   place of publication;
   documents referenced by the first documents;
   documents that reference the first documents; or
   names of authors.

6. The computer-implemented method of claim 5, wherein, when the one or more features include proper names of authors, the one or more features of the documents further include at least one of:
   author email addresses; or
   author affiliations.

7. The computer-implemented method of claim 1, wherein ranking the one or more first document groups comprises:
   for each of the one or more first document groups:
      determining a count of documents that are in both the first document group and among the one or more documents that satisfy the query;
      determining a respective rank for each of the documents that are in both the first document group and among the one or more documents that satisfy the query; and
      determining a name matching score, wherein the name matching score represents a similarity between the name associated with the first document group and the particular name of the author;
      calculating a respective score for the first document group based on the count of documents, the respective rank for each of the documents that are in both the first document group and among the one or more documents that satisfy the query, and the name matching score; and
   ranking the one or more first document groups based on their respective scores.

8. The computer-implemented method of claim 1, wherein the first documents comprise one or more resources from a social network that are associated with a first author proper name in the social network.

9. A system, comprising:
   one or more computers configured to perform operations comprising:
      clustering a plurality of first documents into one or more first document groups, wherein each of the one or more first document groups is associated with a respective author proper name;
      after clustering the plurality of first documents into the one or more first document groups:
         receiving author information from an author;
         generating a query that specifies a particular name of the author and one or more items of the author information received from the author;
         generating a result list of one or more documents that satisfy the query, the documents being ranked according to a document rank;
         ranking the one or more first document groups based on how many documents in the result list are included in each of the one or more first document groups, the ranking favoring first document groups having more documents from the result list over first document groups having fewer document from the result list; and
         providing data describing the one or more first document groups in an order according to the ranking for selection by the author for inclusion in an author profile for the author that identifies documents classified as being authored by the author.

10. The system of claim 9, wherein the operations further comprise:
    receiving a selection of one or more of the first document groups; and
    in response to receiving the selection, including data identifying the one or more selected first document groups in the author profile for the author as documents authored by the author.

11. The system of claim 10, wherein the operations further comprise:
    clustering a plurality of second documents into one or more second document groups, wherein each of the one or more second document groups is associated with a respective author proper name;
    for each of the one or more second document groups:
       determining a correspondence score for the second document group in reference to the author profile for the author;
       determining whether or not the correspondence score satisfies a threshold; and
       when the correspondence score satisfies the threshold, including data identifying the second documents in the second document group as documents authored by the author in the author profile for the author.

12. The system of claim 11, wherein the correspondence score is based on a count of documents that are in both the second document group and in the author profile, a count of documents that are in the second document group and have never been in the author profile, a count of documents that are in the second document group and have been removed from the author profile.

13. The system of claim 9, wherein clustering the plurality of first documents into one or more first document groups comprises:
    clustering the plurality of first documents into one or more first document groups based on one or more respective features of the plurality of first documents, wherein the one or more features include at least one of:
    title;
    place of publication;
    documents referenced by the first documents;
    documents that reference the first documents; or
    names of authors.

14. The system of claim 13, wherein, when the one or more features include proper names of authors, the one or more features of the documents further include at least one of:
    author email addresses; or
    author affiliations.

15. The system of claim 9, wherein ranking the one or more first document groups comprises:
    for each of the one or more first document groups:
       determining a count of documents that are in both the first document group and among the one or more documents that satisfy the query;

determining a respective rank for each of the documents that are in both the first document group and among the one or more documents that satisfy the query; and determining a name matching score, wherein the name matching score represents a similarity between the name associated with the first document group and the particular name of the author;

calculating a respective score for the first document group based on the count of documents, the respective rank for each of the documents that are in both the first document group and among the one or more documents that satisfy the query, and the name matching score; and ranking the one or more first document groups based on their respective scores.

16. The system of claim 9, wherein the first documents comprise one or more resources from a social network that are associated with a first author proper name in the social network.

17. A computer program product, encoded on one or more non-transitory computer storage media, comprising instructions that when executed by one or more computers cause the one or more computers to perform operations comprising:

clustering a plurality of first documents into one or more first document groups, wherein each of the one or more first document groups is associated with a respective author proper name;

after clustering the plurality of first documents into the one or more first document groups:

receiving author information from an author;

generating a query that specifies a particular name of the author and one or more items of the author information received from the author;

generating a result list of one or more documents that satisfy the query, the documents being ranked according to a document rank;

ranking the one or more first document groups based on how many documents in the result list are included in each of the one or more first document groups, the ranking favoring first document groups having more documents from the result over first document groups having fewer documents from the result list; and providing data describing the one or more first document groups in an order according to the ranking for selection by the author for inclusion in an author profile for the author that identifies documents classified as being authored by the author.

18. The computer program product of claim 17, wherein the operations further comprise:

receiving a selection of one or more of the first document groups; and in response to receiving the selection, including data identifying the one or more selected first document groups in the author profile for the author as documents authored by the author.

19. The computer program product of claim 18, wherein the operations further comprise:

clustering a plurality of second documents into one or more second document groups, wherein each of the one or more second document groups is associated with a respective author proper name;

for each of the one or more second document groups:

determining a correspondence score for the second document group in reference to the author profile for the author;

determining whether or not the correspondence score satisfies a threshold; and when the correspondence score satisfies the threshold, including data identifying the second documents in the second document group as documents authored by the author in the author profile for the author.

20. The computer program product of claim 19, wherein the correspondence score is based on a count of documents that are in both the second document group and in the author profile, a count of documents that are in the second document group and have never been in the author profile, a count of documents that are in the second document group and have been removed from the author profile.

21. The computer program product of claim 17, wherein clustering the plurality of first documents into one or more first document groups comprises:

clustering the plurality of first documents into one or more first document groups based on one or more respective features of the plurality of first documents, wherein the one or more features include at least one of:

title;

place of publication;

documents referenced by the first documents;

documents that reference the first documents; or names of authors.

22. The computer program product of claim 21, wherein, when the one or more features include proper names of authors, the one or more features of the documents further include at least one of:

author email addresses; or author affiliations.

23. The computer program product of claim 17, wherein ranking the one or more first document groups comprises:

for each of the one or more first document groups:

determining a count of documents that are in both the first document group and among the one or more documents that satisfy the query;

determining a respective rank for each of the documents that are in both the first document group and among the one or more documents that satisfy the query; and determining a name matching score, wherein the name matching score represents a similarity between the name associated with the first document group and the particular name of the author;

calculating a respective score for the first document group based on the count of documents, the respective rank for each of the documents that are in both the first document group and among the one or more documents that satisfy the query, and the name matching score; and ranking the one or more first document groups based on their respective scores.

24. The computer program product of claim 17, wherein the first documents comprise one or more resources from a social network that are associated with a first author proper name in the social network.

25. A computer-implemented method for identifying information to be added to an author profile, the author profile identifying documents classified as being authored by the author, and the method comprising:

assigning each document from a plurality of documents to one or more document groups, wherein each document is associated with one or more respective author names, wherein each of the document groups includes documents associated with a respective one of the author names, and wherein the plurality of documents includes documents having authors associated with multiple author names;

receiving from a user a name input that specifies an input author name of a particular author and one or more items of author information characterizing the particular author;

generating a query that specifies the input author name and the one or more items of author information;

obtaining search results that identify one or more result documents that satisfy the query;

ranking the one or more document groups based on how many result documents identified by the search results are included in each of the one or more document groups, the ranking favoring document groups having more result documents from the search results over document groups having fewer result documents from the search results; and assigning to a particular author profile for the particular author one or more document groups based on the ranking, the particular author profile identifying documents classified as being authored by the particular author.

26. The computer-implemented method of claim 25, further comprising assigning to the particular author profile one or more additional document groups, comprising:

determining a correspondence score for each of one or more of the document groups in reference to the particular author profile;

determining that the correspondence score for a first document group of the one or more document groups satisfies a threshold; and adding documents in the first document group to the particular author profile as documents authored by the particular author.

27. The computer-implemented method of claim 26, wherein the correspondence score for each document group is based on a count of documents that are in both the document group and in the particular author profile, a count of documents that are in the document group and have never been in the particular author profile, and a count of documents that are in the document group and have been removed from the particular author profile.

28. The computer-implemented method of claim 25, wherein assigning to the particular author profile one or more assigned document groups comprises:

presenting to the user a response that identifies one or more highest-ranked document groups according to the ranking;

receiving from the user a selection input that identifies a selected one or more document groups from among the one or more highest-ranked document groups; and adding documents in the selected one or more document groups to the particular author profile as documents authored by the particular author.

29. The computer-implemented method of claim 25, wherein assigning each document from a plurality of documents to one or more document groups comprises:

assigning the documents based on one or more features of the documents, wherein the one or more features include at least one of:
title;
place of publication;
other documents referenced by the documents;
other documents that reference the documents; or
names of authors.

30. The computer-implemented method of claim 29, wherein, when the one or more features include proper names of authors, the one or more features of the documents further include at least one of author email addresses or author affiliations.

31. A system comprising:

one or more computers and one or more storage devices storing instructions that are operable, when executed by the one or more computers, to cause the one or more computers to perform operations comprising:

assigning each document from a plurality of documents to one or more document groups, wherein each document is associated with one or more respective author names, wherein each of the document groups includes documents associated with a respective one of the author names, and wherein the plurality of documents includes documents having authors associated with multiple author names;

receiving from a user a name input that specifies an input author name of a particular author and one or more items of author information characterizing the particular author;

generating a query that specifies the input author name and the one or more items of author information;

obtaining search results that identify one or more result documents that satisfy the query;

ranking the one or more document groups based on how many result documents identified by the search results are included in each of the one or more document groups, the ranking favoring document groups having more result documents from the search results over document groups having fewer result documents from the search results; and assigning to a particular author profile for the particular author one or more document groups based on the ranking, the particular author profile identifying documents classified as being authored by the particular author.

32. The system of claim 31, the operations further comprising assigning to the particular author profile one or more additional document groups, comprising:

determining a correspondence score for each of one or more of the document groups in reference to the particular author profile;

determining that the correspondence score for a first document group of the one or more document groups satisfies a threshold; and adding documents in the first document group to the particular author profile as documents authored by the particular author.

33. The system of claim 32, wherein the correspondence score for each document group is based on a count of documents that are in both the document group and in the particular author profile, a count of documents that are in the document group and have never been in the particular author profile, and a count of documents that are in the document group and have been removed from the particular author profile.

34. The system of claim 31, wherein assigning to the particular author profile one or more assigned document groups comprises:

presenting to the user a response that identifies one or more highest-ranked document groups according to the ranking;

receiving from the user a selection input that identifies a selected one or more document groups from among the one or more highest-ranked document groups; and adding documents in the selected one or more document groups to the particular author profile as documents authored by the particular author.

35. The system of claim 31, wherein assigning each document from a plurality of documents to one or more document groups comprises:
assigning the documents based on one or more features of the documents, wherein the one or more features include at least one of:
title;
place of publication;
other documents referenced by the documents;
other documents that reference the documents; or
names of authors.

36. The system of claim 35, wherein, when the one or more features include proper names of authors, the one or more features of the documents further include at least one of author email addresses or author affiliations.

37. A computer program product, encoded on one or more non-transitory computer storage media, comprising instructions that when executed by one or more computers cause the one or more computers to perform operations comprising:
assigning each document from a plurality of documents to one or more document groups, wherein each document is associated with one or more respective author names, wherein each of the document groups includes documents associated with a respective one of the author names, and wherein the plurality of documents includes documents having authors associated with multiple author names;
receiving from a user a name input that specifies an input author name of a particular author and one or more items of author information characterizing the particular author;
generating a query that specifies the input author name and the one or more items of author information;
obtaining search results that identify one or more result documents that satisfy the query;
ranking the one or more document groups based on how many result documents identified by the search results are included in each of the one or more document groups, the ranking favoring document groups having more result documents from the search results over document groups having fewer result documents from the search results; and
assigning to a particular author profile for the particular author one or more document groups based on the ranking, the particular author profile identifying documents classified as being authored by the particular author.

38. The computer program product of claim 37, the operations further comprising assigning to the particular author profile one or more additional document groups, comprising:
determining a correspondence score for each of one or more of the document groups in reference to the particular author profile;
determining that the correspondence score for a first document group of the one or more document groups satisfies a threshold; and
adding documents in the first document group to the particular author profile as documents authored by the particular author.

39. The computer program product of claim 38, wherein the correspondence score for each document group is based on a count of documents that are in both the document group and in the particular author profile, a count of documents that are in the document group and have never been in the particular author profile, and a count of documents that are in the document group and have been removed from the particular author profile.

40. The computer program product of claim 37, wherein assigning to the particular author profile one or more assigned document groups comprises:
presenting to the user a response that identifies one or more highest-ranked document groups according to the ranking;
receiving from the user a selection input that identifies a selected one or more document groups from among the one or more highest-ranked document groups; and
adding documents in the selected one or more document groups to the particular author profile as documents authored by the particular author.

41. The computer program product of claim 37, wherein assigning each document from a plurality of documents to one or more document groups comprises:
assigning the documents based on one or more features of the documents, wherein the one or more features include at least one of:
title;
place of publication;
other documents referenced by the documents;
other documents that reference the documents; or
names of authors.

42. The computer program product of claim 41, wherein, when the one or more features include proper names of authors, the one or more features of the documents further include at least one of author email addresses or author affiliations.

* * * * *